US011893346B2

United States Patent
Wan et al.

(10) Patent No.: US 11,893,346 B2
(45) Date of Patent: Feb. 6, 2024

(54) TRANSFORMER-BASED ENCODING INCORPORATING METADATA

(71) Applicant: International Business Machines Corporation, Armonk, NY (US)

(72) Inventors: Hui Wan, White Plains, NY (US); Xiaodong Cui, Chappaqua, NY (US); Luis A. Lastras-Montano, Cortlandt Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 17/308,575

(22) Filed: May 5, 2021

(65) Prior Publication Data
US 2022/0358288 A1    Nov. 10, 2022

(51) Int. Cl.
*G06F 40/284* (2020.01)
*G06F 40/205* (2020.01)
*G06F 40/30* (2020.01)
*G06F 40/42* (2020.01)
*G06F 40/237* (2020.01)
*G06V 30/194* (2022.01)

(52) U.S. Cl.
CPC .......... *G06F 40/284* (2020.01); *G06F 40/205* (2020.01); *G06F 40/237* (2020.01); *G06F 40/30* (2020.01); *G06F 40/42* (2020.01); *G06V 30/194* (2022.01)

(58) Field of Classification Search
CPC .... G06F 40/284; G06F 40/205; G06F 40/237; G06F 40/30; G06F 40/42; G06V 30/194
See application file for complete search history.

(56) References Cited

U.S. PATENT DOCUMENTS

| 10,380,259 | B2 | 8/2019 | Lee et al. |
| 10,614,031 | B1 | 4/2020 | Walters et al. |
| 10,803,357 | B2 | 10/2020 | Yasutomi et al. |
| 11,314,945 | B1 * | 4/2022 | Nguyen ................. G06F 40/42 |
| 11,500,939 | B2 * | 11/2022 | Aggarwal .............. G06N 20/00 |

(Continued)

OTHER PUBLICATIONS

Vaswani, Ashish, et al. "Attention is all you need." Advances in neural information processing systems (2017) pp. 1-11 (Year: 2017).*

(Continued)

*Primary Examiner* — Jesse S Pullias
*Assistant Examiner* — Michael C. Lee
(74) *Attorney, Agent, or Firm* — Garg Law Firm, PLLC; Rakesh Garg; Peter Edwards

(57) ABSTRACT

From metadata of a corpus of natural language text documents, a relativity matrix is constructed, a row-column intersection in the relativity matrix corresponding to a relationship between two instances of a type of metadata. An encoder model is trained, generating a trained encoder model, to compute an embedding corresponding to a token of a natural language text document within the corpus and the relativity matrix, the encoder model comprising a first encoder layer, the first encoder layer comprising a token embedding portion, a relativity embedding portion, a token self-attention portion, a metadata self-attention portion, and a fusion portion, the training comprising adjusting a set of parameters of the encoder model.

19 Claims, 15 Drawing Sheets

(56) References Cited

U.S. PATENT DOCUMENTS

| | | | |
|---|---|---|---|
| 2019/0019233 A1* | 1/2019 | Bhowmick | G06F 16/24578 |
| 2020/0279105 A1* | 9/2020 | Muffat | G06N 3/08 |
| 2020/0293870 A1* | 9/2020 | Isikdogan | G06F 18/214 |
| 2021/0056428 A1* | 2/2021 | Palowitch | G06F 17/10 |
| 2021/0209513 A1* | 7/2021 | Torres | G06N 20/00 |
| 2021/0319176 A1* | 10/2021 | Courtland | G06F 40/253 |
| 2021/0375441 A1* | 12/2021 | Aggarwal | G06N 3/045 |
| 2022/0070195 A1* | 3/2022 | Sern | H04L 63/1425 |
| 2022/0129621 A1* | 4/2022 | Guda | G06F 18/24 |
| 2022/0147838 A1* | 5/2022 | Gu | G06V 20/00 |
| 2022/0350838 A1* | 11/2022 | Henderson | G06F 16/68 |

OTHER PUBLICATIONS

Li, Tianyu, et al. "Deep Heterogeneous Autoencoders for Collaborative Filtering." arXiv preprint arXiv:1812.06610 (2018) (Year: 2018).*

Devlin, Jacob et al., BERT: Pre-training of Deep Bidirectional Transformers for Language Understanding, arXiv preprint arXiv:1810.04805 (2018) (Year: 2018).*

Tan, Chuanqi, et al. "A survey on deep transfer learning." International conference on artificial neural networks. (2018) pp. 270-279 (Year: 2018).*

Cho, Won Ik, et al. "Pay Attention to Categories: Syntax-Based Sentence Modeling with Metadata Projection Matrix." Proceedings of the 34th Pacific Asia Conference on Language, Information and Computation. 2020 pp. 1-10 (Year: 2020).*

Ravindranath, Manjusha, et al. "M2NN: Rare event inference through multi-variate multi-scale attention." 2020 IEEE International Conference on Smart Data Services (SMDS). 2020 pp. 53-62 (Year: 2020).*

Mehta, Divyam, et al. "A transformer-based architecture for fake news classification." Social Network Analysis and Mining (Apr. 17, 2021), pp. 1-12 (Year: 2021).*

Doshi, Ketan. Transformers Explained Visually (Part 1). Dec. 13, 2020. https://web.archive.org/web/20201213160656/https://towardsdatascience.com/transformers-explained-visually-part-1-overview-of-functionality-95a6dd460452 (Year: 2020).*

Doshi, Ketan. Transformers Explained Visually (Part 2). Jan. 2, 2021. https://web.archive.org/web/20210102144728/https://towardsdatascience.com/transformers-explained-visually-part-2-how-it-works-step-by-step-b49fa4a64f34 (Year: 2021).*

Doshi, Ketan. Transformers Explained Visually (Part 3). Jan. 17, 2021. https://web.archive.org/web/20210117040743/https://towardsdatascience.com/transformers-explained-visually-part-3-multi-head-attention-deep-dive-1c1ff1024853 (Year: 2021).*

Peters, Matthew E., et al. "Knowledge enhanced contextual word representations." arXiv preprint arXiv:1909.04164 (2019). (Year: 2019).*

Nadeem, Farah, et al. "Automated essay scoring with discourse-aware neural models." Proceedings of the fourteenth workshop on innovative use of NLP for building educational applications. 2019. (Year: 2019).*

Lee, Younghoo, Joshua Saxe, and Richard Harang. "CATBERT: Context-aware tiny BERT for detecting social engineering emails." arXiv preprint arXiv:2010.03484 (2020). (Year: 2020).*

Lee, Jaejun, et al. "What would elsa do? freezing layers during transformer fine-tuning." arXiv preprint arXiv:1911.03090 (2019), pp. 3-5 (Year: 2019).*

Jones, Tim M., "Transfer Learning for Deep Learning", available at https://developer.ibm.com/articles/transfer-learning-for-deep-learning/ (Jun. 20, 2019) (Year: 2019).*

Bogoychev, Nikolay. "Not all parameters are born equal: Attention is mostly what you need." arXiv preprint arXiv:2010.11859 (2020), pp. 1-11 (Year: 2020).*

Definition of "Distinct" in m-w.com, available at https://web.archive.org/web/20210418201219/https://www.merriam-webster.com/dictionary/distinct (archived Apr. 18, 2021) (Year: 2021).*

Definition of "Pretrain" in m-w.com, available at https://web.archive.org/web/20210119194525/https://www.merriam-webster.com/dictionary/pretrain (archived on Jan. 19, 2021) (Year: 2021).*

Misra, Amita, et al. "Using summarization to discover argument facets in online ideological dialog." arXiv preprint arXiv:1709.00662 (2017), pp. 430-440 (Year: 2017).*

Kuchaiev et al., Training Deep AutoEncoders for Collaborative Filtering, Oct. 10, 2017.

Gosztolya et al., Autoencoder-Based Articulatory-to-Acoustic Mapping for Ultrasound Silent Speech Interfaces, Apr. 10, 2019.

Zhang et al., Learning Universal Sentence Representations with Mean-Max Attention Autoencoder, Proceedings of the 2018 Conference on Empirical Methods in Natural Language Processing, Oct. 31-Nov. 4, 2018.

ip.com, Semi-Supervised Classification Using Object Metadata, Jan. 5, 2018.

ip.com, Persona Identification Through Social Multi-Network Analysis, Jul. 1, 2020.

ip.com, Method for Contextual Semantic Compression and Extraction, Mar. 7, 2020.

* cited by examiner

TRANSFORMER-BASED ENCODING INCORPORATING METADATA

BACKGROUND

The present invention relates generally to a method, system, and computer program product for autoencoding natural language text or non-textual data. More particularly, the present invention relates to a method, system, and computer program product for transformer-based encoding incorporating metadata.

A transformer-based autoencoder, also called a transformer-based autoencoding network, or simply a transformer, has an encoder-decoder architecture. An encoder portion of the transformer includes a set of encoding layers that process an input sequence iteratively, one layer after another. Each encoder layer generates encodings, multidimensional numbers also called vectors, containing information about which parts of the inputs are relevant to each other. A decoder portion of the transformer includes a set of decoding layers that process the output of the encoder iteratively, one layer after another. Each decoder layer uses encodings' incorporated contextual information to generate an output sequence corresponding to the input sequence. To incorporate context, the encoder and decoder layers include an attention mechanism, which for each input, includes other inputs in the sequence weighted by the other inputs' relevance. Decoder layers also have an additional attention mechanism which draws information from the outputs of previous decoder layers as well as from the encodings.

A transformer, as used herein, refers to a transformer-based autoencoding network with an encoder-decoder architecture, an encoder which includes the set of encoding layers but not the set of decoder layers, and a decoder which includes the set of decoder layers but not the set of encoder layers. For example, a typical text classification implementation includes only encoder layers, followed by a classifier layer, and does not include decoder layers. A transformer can be used to process natural language text or a sequence of non-textual data.

The illustrative embodiments recognize that, to encode text using context, attention mechanisms typically combine an embedding corresponding to a token (a token embedding) with a positional embedding (encoding the token's position within a portion or segment of text) and a segmentation embedding (encoding which segment of text the token is located in). However, both positional and segmentation embeddings are based only on the text within a document. As a result, metadata, information about the text within a document such as turn and speaker information in dialogues, threading information in transcripts of discussion forums, movie subtitles, sectioning hierarchy information and other elements of structured text, is often not used when encoding natural language text even when available.

The illustrative embodiments also recognize that, even when metadata is used in text processing, the model architecture does not explicitly account for attention between tokens supplied by metadata or model the effects of metadata through layers of the transformer. Instead, portions of metadata are encoded as embeddings and combined with the token embedding in an existing attention mechanism. For example, in a conversation transcript, metadata might indicate that some portions were spoken or texted by Participant 1 and some by Participant 2. Thus, all the Participant 1 portions might be considered one segment of text and all the Participant 2 portions might be considered a second segment of text, and corresponding segmentation embeddings determined and incorporated into text encoding. Alternatively, a system might compute an additional embedding encoding which speaker is associated with a token, and the additional embedding combined with the token, positional, and segmentation embeddings in an existing attention mechanism. However, encoding specific portions or types of metadata into specific embeddings is not easily generalizable to a model that is trainable on many types of text and metadata, functions comparably to existing models when processing text without metadata, and is usable in a variety of downstream tasks. Further, model architectures for processing non-textual data do not explicitly account for attention between tokens supplied by metadata or model the effects of metadata through layers of the transformer either.

Thus, the illustrative embodiments also recognize that there is an unmet need for a transformer-based autoencoder architecture that includes parameters dedicated to modelling attention attributed to metadata, and is capable of using a metadata encoding scheme that does not require encoding specific portions or types of metadata into specific embeddings.

SUMMARY

The illustrative embodiments provide a method, system, and computer program product. An embodiment includes a method that constructs, from metadata of a corpus of natural language text documents, a relativity matrix, a row-column intersection in the relativity matrix corresponding to a relationship between two instances of a type of metadata. An embodiment trains, generating a trained encoder model, an encoder model to compute an embedding corresponding to a token of a natural language text document within the corpus and the relativity matrix, the encoder model comprising a first encoder layer, the first encoder layer comprising a token embedding portion, a relativity embedding portion, a token self-attention portion, a metadata self-attention portion, and a fusion portion, the training comprising adjusting a set of parameters of the encoder model. Thus, the embodiment provides transformer-based encoding incorporating metadata.

In another embodiment, the token embedding portion computes a set of token embeddings, a token embedding in the set of token embeddings corresponding to a token of a natural language text document within the corpus. Thus, the embodiment provides a method that computes a set of token embeddings.

In another embodiment, the token comprises a portion of a word of the natural language text document. Thus, the embodiment provides a method that computes a token embedding from a portion of a word of the natural language text document.

In another embodiment, the token embedding comprises a multidimensional numerical representation of the token. Thus, the embodiment provides a method that computes a token embedding comprising a multidimensional numerical representation.

In another embodiment, the token embedding comprises a combination of a multidimensional numerical representation of the token, a multidimensional numerical representation of a position of the token within the natural language text document, and a multidimensional numerical representation of a segment of the natural language text document in which the token is located. Thus, the embodiment provides a method that computes a token embedding comprising a multidimensional numerical representation.

In another embodiment, the relativity embedding portion computes a set of relativity embeddings, a relativity embedding in the set of relativity embeddings comprising a multidimensional numerical representation of the row-column intersection. Thus, the embodiment provides a method that computes a set of relativity embeddings.

In another embodiment, the token self-attention portion adjusts an input token embedding according to a set of token attention weights, a token attention weight in the set of token attention weights corresponding to a relationship within the natural language text document between two tokens, the set of token attention weights computed during the training. Thus, the embodiment provides a method that adjusts an input token embedding according to a set of token attention weights.

In another embodiment, the metadata self-attention portion adjusts an input relativity embedding according to a set of metadata attention weights, the set of metadata attention weights computed during the training. Thus, the embodiment provides a method that adjusts an input relativity embedding according to a set of metadata attention weights.

In another embodiment, the fusion portion combines outputs of the token self-attention portion and the metadata self-attention portion. Thus, the embodiment provides further detail of the fusion portion.

In another embodiment, the training comprises: initializing a set of parameters of the token embedding portion to a base set of token embedding parameters; initializing a set of parameters of the token self-attention portion to a base set of token self-attention parameters; first training, generating a partially trained encoder model, the encoder model, the first training comprising adjusting a set of parameters of the relativity embedding portion and a set of parameters of the metadata self-attention portion while the set of parameters of the token embedding portion is set to the base set of token embedding parameters and the set of parameters of the token self-attention portion is set to the base set of token self-attention parameters; and second training, generating the trained encoder model, the second training comprising adjusting the set of parameters of the encoding model. Thus, the embodiment provides further detail of training the encoder model.

In another embodiment, the encoder model further comprises a first decoder layer, the first decoder layer comprising a decoder token self-attention portion, a decoder metadata self-attention portion, a decoder fusion portion, and a decoder attention portion, the training comprising adjusting a set of parameters of the first decoder layer. Thus, the embodiment provides further detail of the first decoder layer.

In another embodiment, the decoder attention portion adjusts an output of an encoder layer according to a set of attention weights, the set of attention weights computed during the training. Thus, the embodiment provides further detail of the decoder attention portion.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
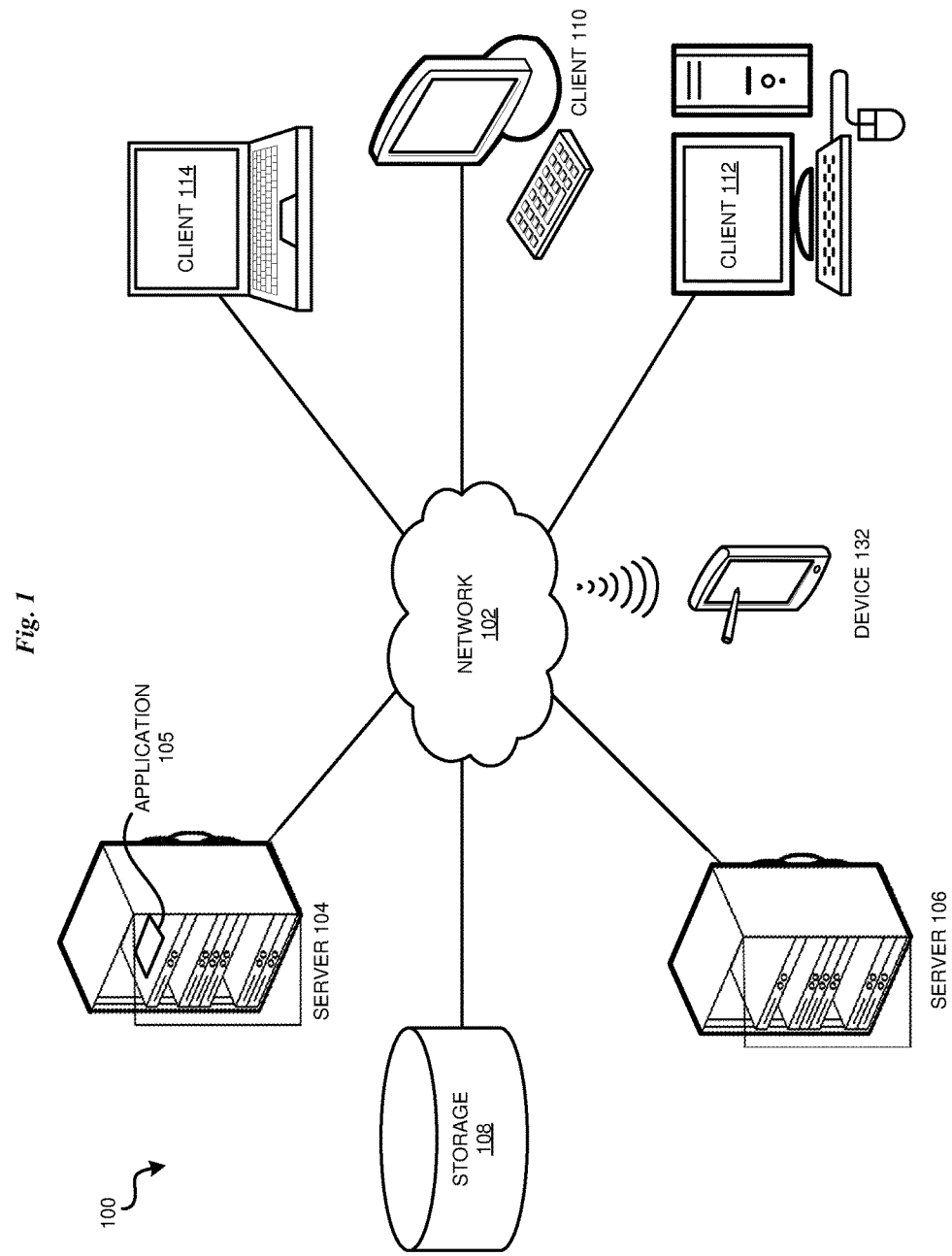
FIG. 1 depicts a block diagram of a network of data processing systems in which illustrative embodiments may be implemented.

The illustrative embodiments also recognize that there is an unmet need for a transformer-based autoencoder architecture that includes parameters dedicated to modelling attention attributed to metadata, and is capable of using a metadata encoding scheme that does not require encoding specific portions or types of metadata into specific embeddings. The illustrative embodiments recognize that the presently available tools or solutions do not address these needs or provide adequate solutions for these needs. The illustrative embodiments used to describe the invention generally address and solve the above-described problems and other problems related to transformer-based encoding incorporating metadata.

An embodiment can be implemented as a software application. The application implementing an embodiment can be configured as a modification of an existing natural language text processing system or processing system for non-textual data, as a separate application that operates in conjunction with an existing natural language text processing system or processing system for non-textual data, a standalone application, or some combination thereof.

Particularly, some illustrative embodiments provide a method that constructs, from metadata of a corpus of natural language text documents or non-textual data, a relativity matrix, and trains, generating a trained encoding model, an encoding model to compute an embedding corresponding to a portion of a document or non-textual data within the corpus and the relativity matrix.

An embodiment constructs a relativity matrix from metadata of a corpus of natural language text documents or non-textual data. A relativity matrix is a two-dimensional matrix storing relationships between instances of a type of metadata. In particular, rows and columns of the relativity matrix denote instances of a type of metadata, and a row-column intersection stores data of a relationship between two instances of a type of metadata.

In one non-limiting example of a relativity matrix coding scheme, an entry in a relativity matrix is set to one if there is a relationship between two instances of a type of metadata, and zero if there is not a relationship. For example, in a conversation transcript, metadata might indicate which portions were spoken or texted by which participant. Thus, rows and columns of a corresponding relativity matrix might denote participants. An entry in the relativity matrix is set to one if there is a relationship between the participant denoted by the entry's row and the participant denoted by the entry's column, and zero if there is not a relationship.

In another non-limiting example of a relativity matrix coding scheme, an entry in a relativity matrix is set to a distance, within the metadata, between two instances of a type of metadata. For example, in a conversation transcript, metadata might indicate which portions were spoken or texted by which participant. Thus, rows and columns of a corresponding relativity matrix might denote participants, and an entry in the relativity matrix might be set to the number of conversational turns between the participant denoted by the entry's row and the participant denoted by the entry's column. In another example of a conversation transcript, metadata might record a timestamp corresponding to each change of participant, or turn, in a conversation. Thus, rows and columns of a corresponding relativity matrix might denote specific turns, and an entry in the relativity matrix might be set to the amount of time elapsed between the turn denoted by the entry's row and the turn denoted by the entry's column. Alternatively, rows and columns of a corresponding relativity matrix might denote specific turns, and an entry in the relativity matrix might be set to the number of turns between the turn denoted by the entry's row and the turn denoted by the entry's column.

In another non-limiting example, a document or conversation transcript is represented by a tree structure described by metadata. Rows and columns of a corresponding relativity matrix might denote specific nodes of the tree structure. An entry in the relativity matrix might be set to the number of tree links between the node denoted by the entry's row and the node denoted by the entry's column. In a variation, an entry in the relativity matrix might be set to a positive distance between node i and node j if node i is node j's ancestor in the tree, a negative distance between node i and node j if node j is node i's ancestor in the tree, and the sum of the depth of the tree and the distance between node i and node j otherwise.

Other non-limiting examples of encoding metadata relationships using a relativity matrix to denote relative distance between instances of metadata, in a manner described herein, include relationships between characters, scene locations, or other interactions within textual, audio, or video content such as a transcript, script, or movie, relationships between entities expressed in content, and relationships between elements of a parse tree, knowledge graph, hyperlinks, or other structured information relationships.

An embodiment includes a transformer model. The model receives, as input, a sequence of tokens and a relativity matrix, and generates embeddings, also called encodings, corresponding to input tokens and adjusted according to context including the relativity matrix. When processing natural language text, a token is a word, portion of a word, or other portion of a natural language text sequence such as a sentence within a document, and the input sequence is typically a tokenized sentence or other tokenized portion of text, but need not be a grammatically correct sentence. When processing non-textual data, a token is a portion of non-textual data, for example a single frame of video or a predetermined time duration of video data. The model includes one or more encoder layers, connected in series. In one embodiment, the last encoder layer is followed by an optional task specific layer outputting a prediction such as a text classification. The model also includes an embedding portion that generates embeddings from model inputs and passes the generated embeddings to the first encoder layer for adjustment of the generated embeddings.

In particular, the embedding portion receives, as input, a sequence of tokens. The embedding portion is configured in a presently available neural network configuration to generate a token embedding encoding a token. The embedding portion is also, optionally, configured in a presently available neural network configuration to generate a positional embedding encoding the token's position within a portion or segment of text and a segmentation embedding encoding which segment of text the token is located in. If a positional embedding and a segmentation embedding are generated, the embedding portion is configured in a presently available neural network configuration to combine the token, positional, and segmentation embeddings into a token embedding. In one embodiment, the token, positional, and segmentation embeddings are combined by adding them together. In another embodiment, the token, positional, and segmentation embeddings are combined using a weighted sum, in which the weights are model parameters determined during model training.

The embedding portion also receives, as input, a relativity matrix. The embedding portion generates a set of relativity embeddings, each encoding an entry in a relativity matrix. One embodiment uses a projection matrix, initialized to a starting configuration (for example, a set of pseudo-randomly selected values) and adjusted model training, to generate the set of relativity embeddings. Another embodiment uses a set of heuristics to generate the set of relativity embeddings. Other techniques for generating the set of relativity embeddings are also possible and contemplated within the scope of the illustrative embodiments.

In one embodiment, each encoder layer is configured identically, and includes a token self-attention portion, one or more metadata self-attention portions, and fusion, feedforward, and optional additional and normalization portions. In another embodiment, each encoder layer is not configured identically. Instead, some encoder layers do not include one or more metadata self-attention portions or fusion portions. In one embodiment, only the last six encoder layers include metadata self-attention portions and fusion portions, speeding up model training time relative to an embodiment in which each encoding layer is configured identically.

In one presently known technique, the token self-attention portion is described by three weight matrices: query weights $W_Q$, key weights $W_K$, and value weights $W_V$. In particular, for each token i, the input embedding $x_i$ is multiplied with each of the weight matrices to produce query vector $q_i = x_i W_Q$, key vector $k_i = x_i W_K$, and value vector $v_i = x_i W_V$. Then, $A_{i,j} = q_i k_j$, the dot product between $q_i$ and $k_j$, where $A_{i,j}$ is the attention weight from token i to token j. The attention weights are divided by the square root of the dimension of the key vectors (to stabilize gradients between matrix values during training) and passed through a softmax which normalizes the weights to sum to 1. Thus, the token self-attention portion obtains contextual attention of token i to token j according to attention weights $A_{i,j}$.

A metadata self-attention portion computes a set of metadata attention weights $A^{meta}$, which is computed with an input set of relativity embeddings $S^{meta}$. If there is more than one input set of relativity embeddings, each feeds into a separate metadata self-attention portion. In one embodiment, $A^{meta}_{ij} = (q_i + B) S^{metaT}_{ij}$, where B is a learnable bias term and $S^{metaT}_{ij}$ is a transposed version of $S^{meta}$. In another embodiment, $A^{meta}_{ij} = (q_i + B) S^{metaT}_{ij} + S^{meta}_{ij} (k_j + B')^T$, where B and B' are learnable bias terms and $(k_j + B')^T$ is a transposed version of $(k_j + B')$. Another embodiment uses a neural network to combine the set of relativity embeddings $S^{meta}$ with K, a matrix of the set of key vectors. Then a dot product is computed between the combination result and Q, a matrix of the set of query vectors and the result summed with B $S^{metaT}_{ij}$. Other techniques for computing metadata attention weights $A^{meta}$ from relativity embeddings $S^{meta}$ are also possible and contemplated within the scope of the illustrative embodiments.

The fusion portion combines the results of the token self-attention and one or more metadata self-attention portions. One embodiment uses a neural network to combine the results of the token self-attention and metadata self-attention portions. Another embodiment computes an element-wise product of A and $A^{meta}$. Other techniques for combining the results of the token self-attention and metadata self-attention portions are also possible and contemplated within the scope of the illustrative embodiments.

In one embodiment, an addition and normalization portion adds the output from the fusion portion and the input to the token self-attention portion, then normalizes the result and passes the normalized result to a feedforward portion. In another embodiment, the addition and normalization portion is not present, and the output of the fusion portion is passed directly to the feedforward portion. In one embodiment, the feedforward portion is implemented using a linear layer, with weights described by a weight matrix. The weights are adjusted during model training. In another embodiment, each metadata self-attention portion is followed by an addition and normalization portion combining input and output of that particular metadata self-attention portion, and the addition and normalization portions combining the output from the fusion portion and the input to the token self-attention portion is not present.

In one embodiment, the output of the feedforward portion and input to the feedforward portion are added together and normalized and the result passed to an input portion of a second encoder layer, for additional processing. In another embodiment, the output of the feedforward portion is passed to an input portion of a second encoder layer, for additional processing.

In an embodiment, the transformer model includes one or more decoder layers, connected in series. Each decoder layer receives, as input, the sequence of token embeddings and the set of relativity embeddings generated by the embedding portion. Each decoder layer also receives, as input, output from the last encoder layer in the series of encoder layers.

In one embodiment, each decoder layer is configured identically, and includes a token self-attention portion, one or more metadata self-attention portions, and fusion, attention, feedforward, and optional additional and normalization portions. In another embodiment, each decoder layer is not configured identically. Instead, some decoder layers do not include one or more metadata self-attention portions or fusion portions.

The token self-attention portion, metadata self-attention portions, and fusion portions of a decoder layer operate similarly to those of an encoder layer. In one embodiment, an addition and normalization portion adds the output from the fusion portion and the input to the token self-attention portion, then normalizes the result and passes the normalized result to an attention portion. In another embodiment, the addition and normalization portion is not present, and the output of the fusion portion is passed directly to the attention portion.

The attention portion combines output from the fusion portion or the addition and normalization portion with output from the last encoder layer in the set of encoder layers. In one embodiment, the output from the last encoder layer is in the form of key vectors and value vectors, and the output from the fusion portion or the addition and normalization portion is in the form of a query vector. The attention portion combines inputs using a presently known technique.

In one embodiment, an addition and normalization portion adds the output from the attention portion and the input to the attention portion, then normalizes the result and passes the normalized result to a feedforward portion. In another embodiment, the addition and normalization portion is not present, and the output of the attention portion is passed directly to the feedforward portion. In one embodiment, the feedforward portion is implemented using a linear layer, with weights described by a weight matrix. The weights are adjusted during model training. In one embodiment, the output of the feedforward portion and input to the feedforward portion are added together and normalized and the result passed to an input portion of a second decoder layer, for additional processing. In another embodiment, the output of the feedforward portion is passed to an input portion of a second decoder layer, for additional processing.

An embodiment trains the transformer model. During training, the embodiment learns to sets model parameters, including query weights, key weights, value weights, attention and metadata attention weights, one or more learnable bias terms, and parameters of the embedding portions, to values that produce output training data has labelled as correct. One embodiment trains the entire model at once, by initializing model parameters to a base set of parameters (e.g. a pseudo-randomly selected set of parameters) and trains the model by adjusting the set of parameters using a set of training data.

Another embodiment trains the model in stages. The embodiment sets parameters of the token embedding and token self-attention portions to a base set of parameters. As one non-limiting example, the base set of parameters is a pseudo-randomly selected set of parameters. As another non-limiting example, the base set of parameters is that of already-trained token embedding and token self-attention portions, already trained using a presently available technique. Using, as the base set of parameters, those of already-trained token embedding and token self-attention portions saves training time by starting from a partially trained state. In a first training stage, an embodiment holds parameters of the token embedding and token self-attention portions constant and trains the model by adjusting parameters of the relativity embedding, one or more metadata self-attention portions, and the fusion portion, using a set of training data. Then, in a second training stage, the embodiment trains the entire model by adjusting one or more of the entire set of parameters.

Model training data is adjustable based on the eventual use of the model's output. Some non-limiting examples of eventual uses of the model's output are to perform masked language modeling (using context words surrounding a mask token, or blank to be filled in, to try to predict what word should replace the mask token), masked context regression (masking a randomly-selected utterance and predicting an encoding vector for the masked utterance), distributed utterance order ranking (organizing randomly shuffled utterances of a conversation into a coherent dialogue context), and utterance or sentence order selection. For example, for a general model that is to be used on both plain text (without metadata) and natural language text with accompanying metadata, the training data should include both plain text and different genres of text with accompanying metadata. However, for a model to be used on data incorporating one genre of text with accompanying metadata—for example, a model to be used only for dialogue-related tasks—the training data need only include dialogue-specific text with accompanying metadata, such as conversation turn, speaker, or timestamp data.

Once the model has been trained, either generally or for a specific genre, an embodiment, optionally, further trains the model to perform a specific downstream task. Some non-limiting examples of downstream tasks for documents are masked sentence selection in structured documents, question answering and answer retrieval from documents, and structured document summarization. Some non-limiting examples of downstream tasks for dialogues are next utterance selection, utterance order selection (putting utterances or other portions of dialogue in order), masked utterance selection, next utterance generation, and conversational question answering.

The manner of transformer-based encoding incorporating metadata described herein is unavailable in the presently available methods in the technological field of endeavor pertaining to natural language text processing. A method of an embodiment described herein, when implemented to execute on a device or data processing system, comprises substantial advancement of the functionality of that device or data processing system in constructing, from metadata of a corpus of natural language text documents or non-textual data, a relativity matrix, and training, generating a trained encoding model, an encoding model to compute an embedding corresponding to a token of a natural language text document within the corpus and the relativity matrix.

The illustrative embodiments are described with respect to certain types of tokens, embeddings, relativities, matrices, encoding portions, attention portions, fusion portions, neural networks, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
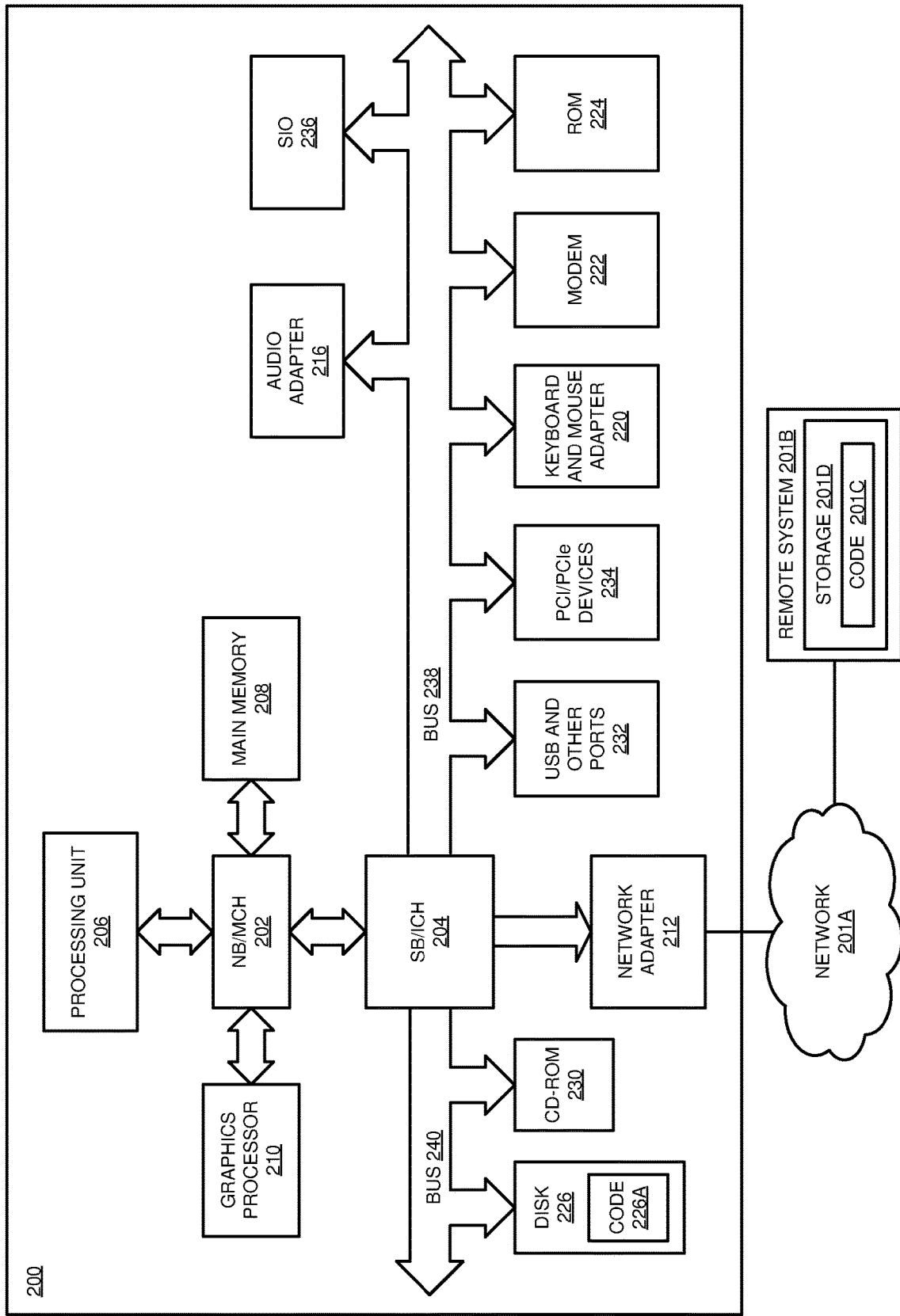
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
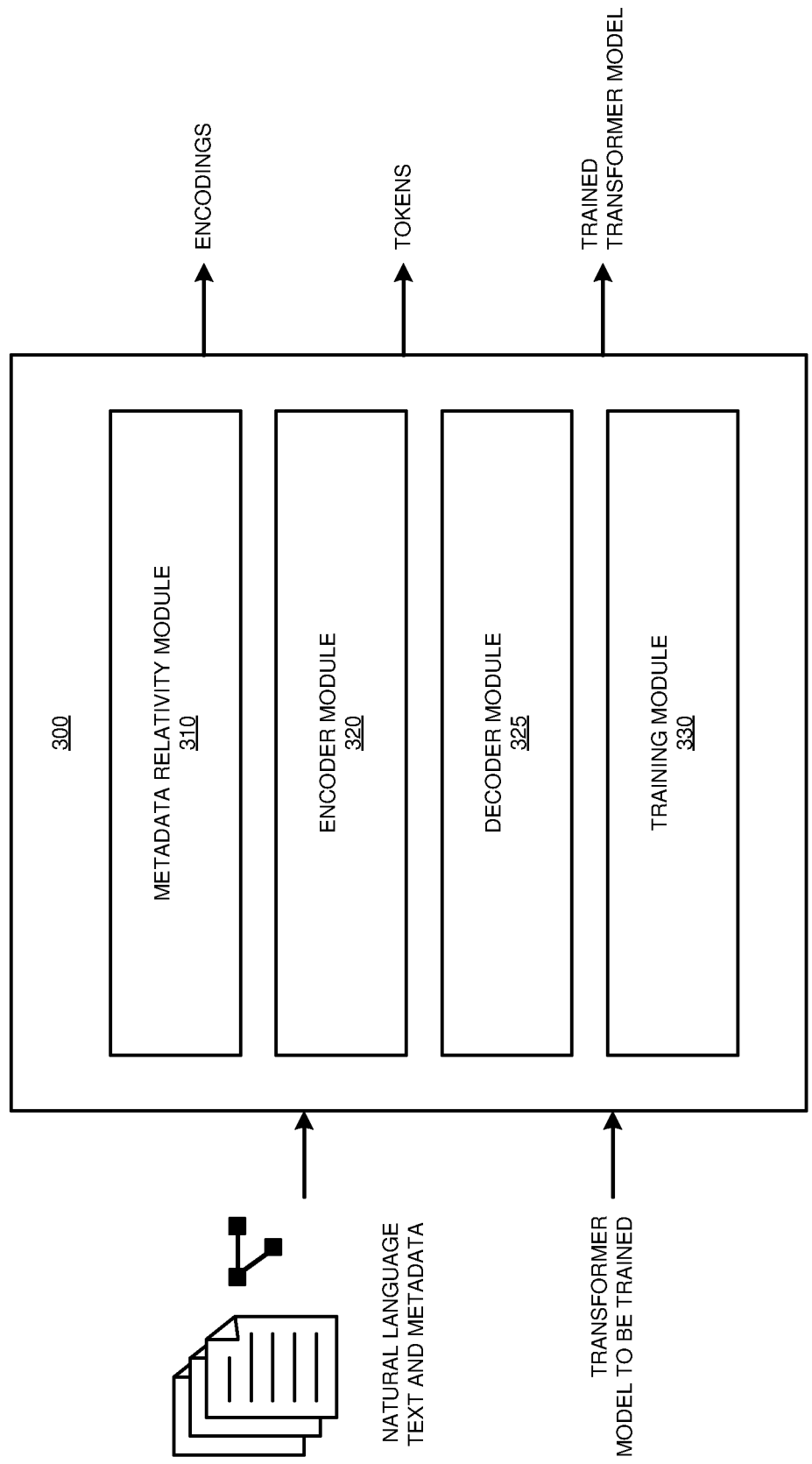
FIG. 3 depicts a block diagram of an example configuration for transformer-based encoding incorporating metadata in accordance with an illustrative embodiment.

With reference to FIG. 3, this figure depicts a block diagram of an example configuration for transformer-based encoding incorporating metadata in accordance with an illustrative embodiment. Application 300 is an example of application 105 in FIG. 1 and executes in any of servers 104 and 106, clients 110, 112, and 114, and device 132 in FIG. 1.

Metadata relativity module 310 constructs a relativity matrix from metadata of a corpus of natural language text documents. Rows and columns of the relativity matrix denote instances of a type of metadata, and a row-column intersection stores data of a relationship between two instances of a type of metadata. In one example relativity matrix coding scheme, an entry in a relativity matrix is set to one if there is a relationship between two instances of a type of metadata, and zero if there is not a relationship. In another example relativity matrix coding scheme, an entry in a relativity matrix is set to a distance, within the metadata, between two instances of a type of metadata. In another example relativity matrix coding scheme, a document or conversation transcript is represented by a tree structure described by metadata, and an entry in the relativity matrix might be set based on the distance between the node denoted by the entry's row and the node denoted by the entry's column. Other examples of encoding metadata relationships using a relativity matrix to denote relative distance between instances of metadata, in a manner described herein, include relationships between characters, scene locations, or other interactions within textual, audio, or video content such as a transcript, script, or movie, relationships between entities expressed in content, and relationships between elements of a parse tree, knowledge graph, hyperlinks, or other structured information relationships.

Encoder module 320 implements an encoder portion of a transformer model. Module 320 receives, as input, a sequence of tokens and a relativity matrix, and generates embeddings corresponding to input tokens and adjusted according to context including the relativity matrix. More detail of module 320 is presented with reference to FIGS. 4 and 5.

Decoder module 325 implements an optional decoder portion of a transformer model, including one or more decoder layers connected in series. Each decoder layer receives, as input, the sequence of token embeddings and the set of relativity embeddings generated by encoder module 320. Each decoder layer also receives, as input, output from the last encoder layer in the series of encoder layers within module 320. More detail of module 325 is presented with reference to FIGS. 6 and 7.

Training module 330 trains the transformer model. During training, module 330 sets model parameters, including query weights, key weights, value weights, attention and metadata attention weights within the encoder and decoder portions, one or more learnable bias terms, and parameters of the embedding portions, to values that produce output training data has labelled as correct. One implementation of module 330 trains the entire model at once, by initializing model parameters to a base set of parameters (e.g. a pseudo-randomly selected set of parameters) and trains the model by adjusting the set of parameters using a set of training data.

Another implementation of module 330 trains the model in stages. Module 330 sets parameters of the token embedding and token self-attention portions to a base set of parameters. As one non-limiting example, the base set of parameters is a pseudo-randomly selected set of parameters. As another non-limiting example, the base set of parameters is that of already-trained token embedding and token self-attention portions, already trained using a presently available technique. In a first training stage, module 330 holds parameters of the token embedding and token self-attention portions constant and trains the model by adjusting parameters of the relativity embedding, one or more metadata self-attention portions, the attention portion, and the fusion portion, using a set of training data. Then, in a second training stage, module 330 trains the entire model by adjusting one or more of the entire set of parameters.

Figure 4:
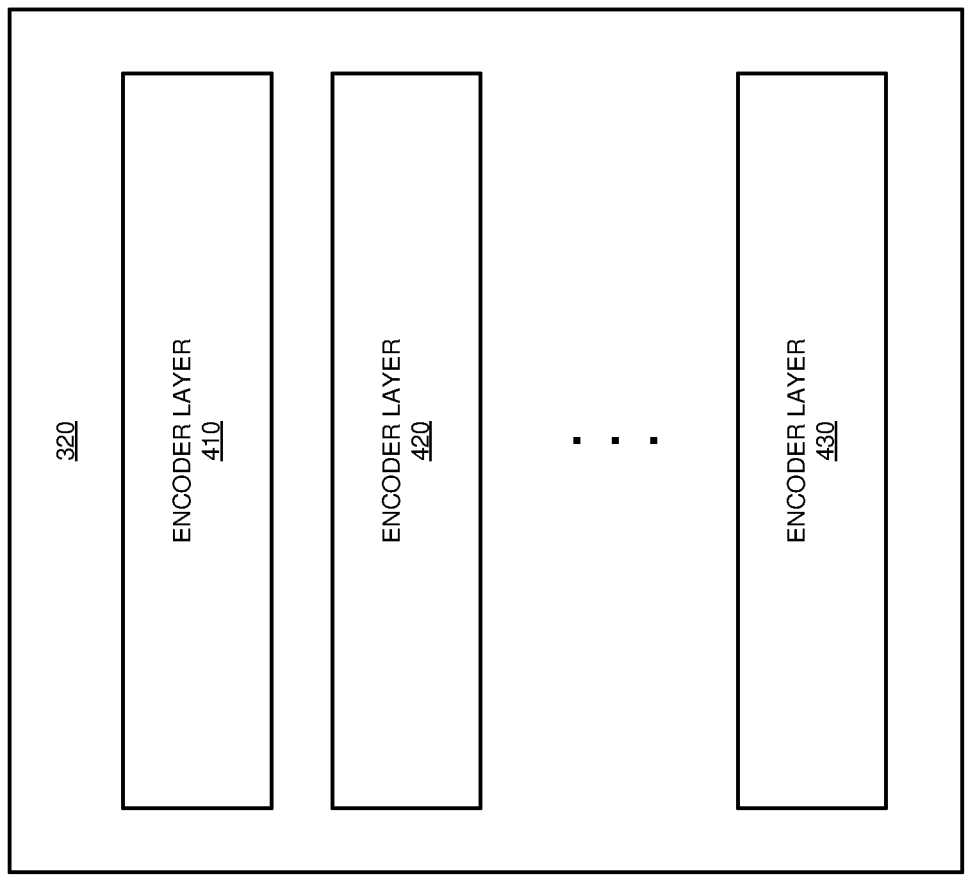
FIG. 4 depicts a block diagram of an example configuration for transformer-based encoding incorporating metadata in accordance with an illustrative embodiment.

With reference to FIG. 4, this figure depicts a block diagram of an example configuration for transformer-based encoding incorporating metadata in accordance with an illustrative embodiment. Encoder module 320 is the same as encoder module 320 in FIG. 3.

Encoder module 320 includes a set of encoder layers, including encoder layer 410, encoder layer 420, and encoder layer 430. The encoder layers are connected in series, and there may be additional encoder layers between encoder layers 420 and 430.

Figure 5:
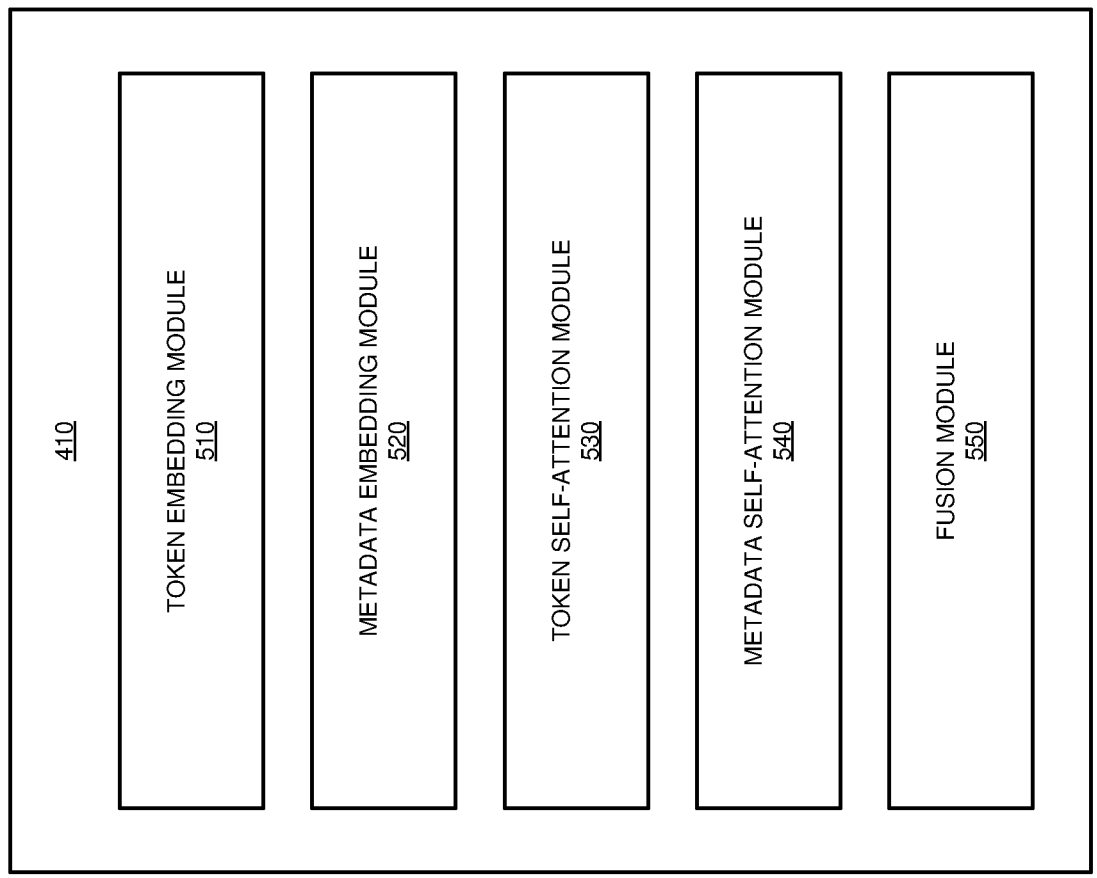
FIG. 5 depicts a block diagram of an example configuration for transformer-based encoding incorporating metadata in accordance with an illustrative embodiment.

With reference to FIG. 5, this figure depicts a block diagram of an example configuration for transformer-based encoding incorporating metadata in accordance with an illustrative embodiment. Encoder layer 410 is the same as encoder layer 410 in FIG. 4.

Token embedding module 510, configured in a presently available neural network configuration, generates a token embedding encoding a token. Module 510 is also, optionally, configured in a presently available neural network configuration to generate a positional embedding encoding the token's position within a portion or segment of text and a segmentation embedding encoding which segment of text the token is located in. If a positional embedding and a segmentation embedding are generated, module 510 is configured in a presently available neural network configuration to combine the token, positional, and segmentation embeddings into a token embedding. In one implementation of module 510, the token, positional, and segmentation embeddings are combined by adding them together.

Metadata embedding module 520, configured in a presently available neural network configuration, generates a set of relativity embeddings, each encoding an entry in a relativity matrix.

Token self-attention module 530 is described by three weight matrices: query weights $W_Q$, key weights $W_K$, and value weights $W_V$. In particular, for each token i, the input embedding $x_i$ is multiplied with each of the weight matrices to produce query vector $q_i = x_i W_Q$, key vector $k_i = x_i W_K$, and value vector $v_i = x_i W_V$. Then, $A_{i,j} = q_i k_j$, the dot product between $q_i$ and $k_j$, where $A_{i,j}$ is the attention weight from token i to token j. The attention weights are divided by the square root of the dimension of the key vectors (to stabilize gradients between matrix values during training) and passed through a softmax which normalizes the weights to sum to 1.

Metadata self-attention module 540 computes a set of metadata attention weights $A^{meta}$, which is computed with an input set of relativity embeddings $S^{meta}$. If there is more than one input set of relativity embeddings, each feeds into a separate metadata self-attention portion. In one embodiment, $A^{meta}_{ij} = (q_i + B) S^{metaT}_{ij}$, where B is a learnable bias term and $S^{metaT}_{ij}$ is a transposed version of $S^{meta}$. In another embodiment, $A^{meta}_{ij} = (q_i + B) S^{metaT}_{ij} + S^{meta}_{ij} (k_j + B')^T$, where B and B' are learnable bias terms and $(k_j + B')^T$ is a transposed version of $(k_j + B')$. Another embodiment uses a neural network to combine the set of relativity embeddings $S^{meta}$ with K, a matrix of the set of key vectors. Then a dot product is computed between the combination result and Q, a matrix of the set of query vectors and the result summed with B $S^{metaT}_{ij}$.

Fusion module 550 combines the results of modules 530 and 540. One implementation of module 550 uses a neural network to combine the results of the token self-attention and metadata self-attention portions. Another implementation of module 550 computes an element-wise product of A and $A^{meta}$.

Figure 6:
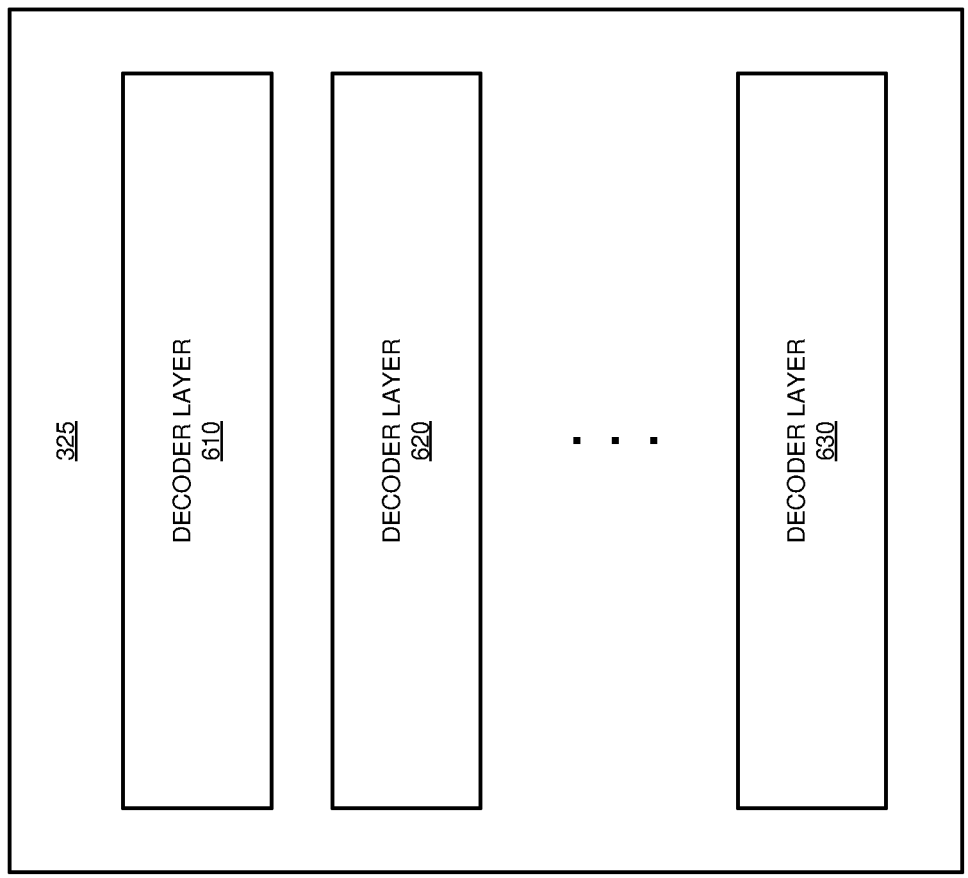
FIG. 6 depicts a block diagram of an example configuration for transformer-based encoding incorporating metadata in accordance with an illustrative embodiment.

With reference to FIG. 6, this figure depicts a block diagram of an example configuration for transformer-based encoding incorporating metadata in accordance with an illustrative embodiment. Decoder module 325 is the same as encoder module 325 in FIG. 3.

Decoder module 325 includes a set of encoder layers, including decoder layer 610, decoder layer 620, and decoder layer 630. The decoder layers are connected in series, and there may be additional decoder layers between encoder layers 620 and 630. Each decoder layer receives, as input, the sequence of token embeddings and the set of relativity embeddings generated by modules 510 and 520. Each decoder layer also receives, as input, output from encoder layer 430, the last encoder layer in the series of encoder layers.

Figure 7:
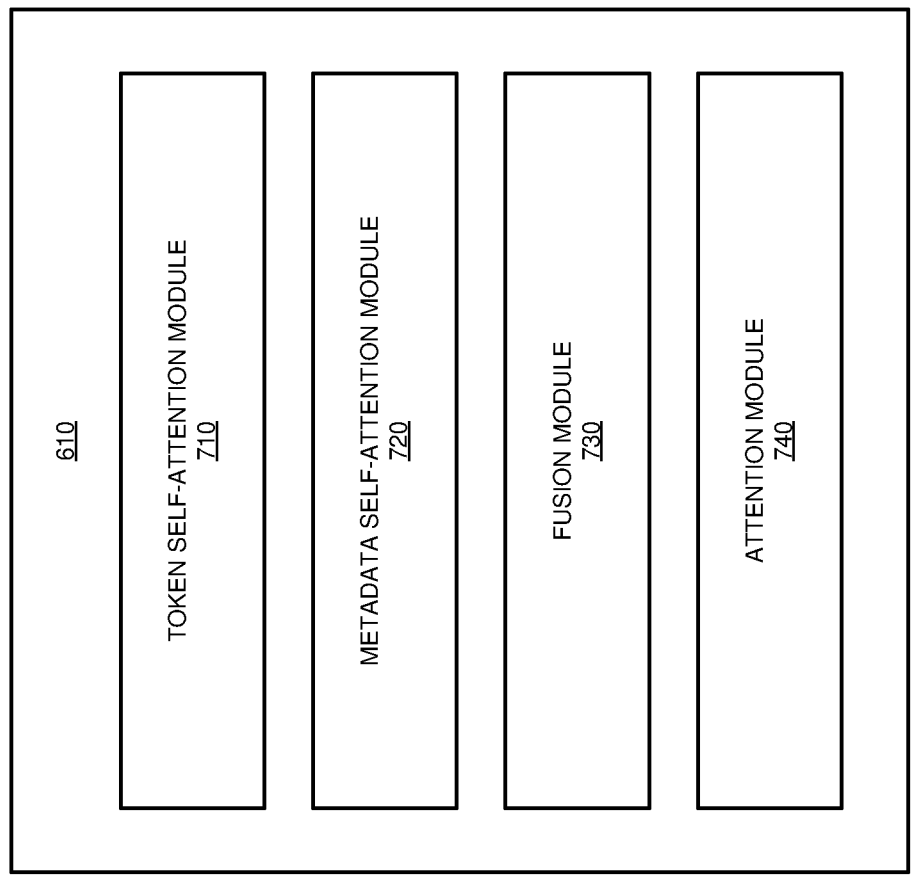
FIG. 7 depicts a block diagram of an example configuration for transformer-based encoding incorporating metadata in accordance with an illustrative embodiment.

With reference to FIG. 7, this figure depicts a block diagram of an example configuration for transformer-based encoding incorporating metadata in accordance with an illustrative embodiment. Decoder layer 610 is the same as decoder layer 610 in FIG. 6.

As depicted, decoder layer 610 includes token self-attention module 710, one or more metadata self-attention modules 720, fusion module 730, and attention module 740. The token self-attention module 710, metadata self-attention modules 720, and fusion module 730 operate similarly to those of encoder layer 410. In one implementation of layer 610, an addition and normalization portion adds the output from fusion module 730 and the input to token self-attention module 710, then normalizes the result and passes the normalized result to attention module 740. In another implementation of layer 610, the addition and normalization portion is not present, and the output of fusion module 730 is passed directly to attention module 740.

Attention module 740 combines output from fusion module 730 or the addition and normalization portion with output from the last encoder layer in the set of encoder layers. In one implementation of layer 610, the output from the last encoder layer is in the form of key vectors and query vectors, and the output from fusion portion 740 or the addition and normalization portion is in the form of a query vector. Attention module 740 combines inputs using a presently known technique.

In one implementation of layer 610, a second addition and normalization portion adds the output from attention module 740 and the input to attention module 740, then normalizes the result and passes the normalized result to a feedforward portion. In another embodiment, the addition and normalization portion is not present, and the output of attention module 740 is passed directly to the feedforward portion. In one implementation of layer 610, the output of the feedforward portion and input to the feedforward portion are added together and normalized and the result passed to an input portion of a second decoder layer, for additional processing. In another implementation, the output of the feedforward portion is passed to an input portion of a second decoder layer, for additional processing.

Figure 8:
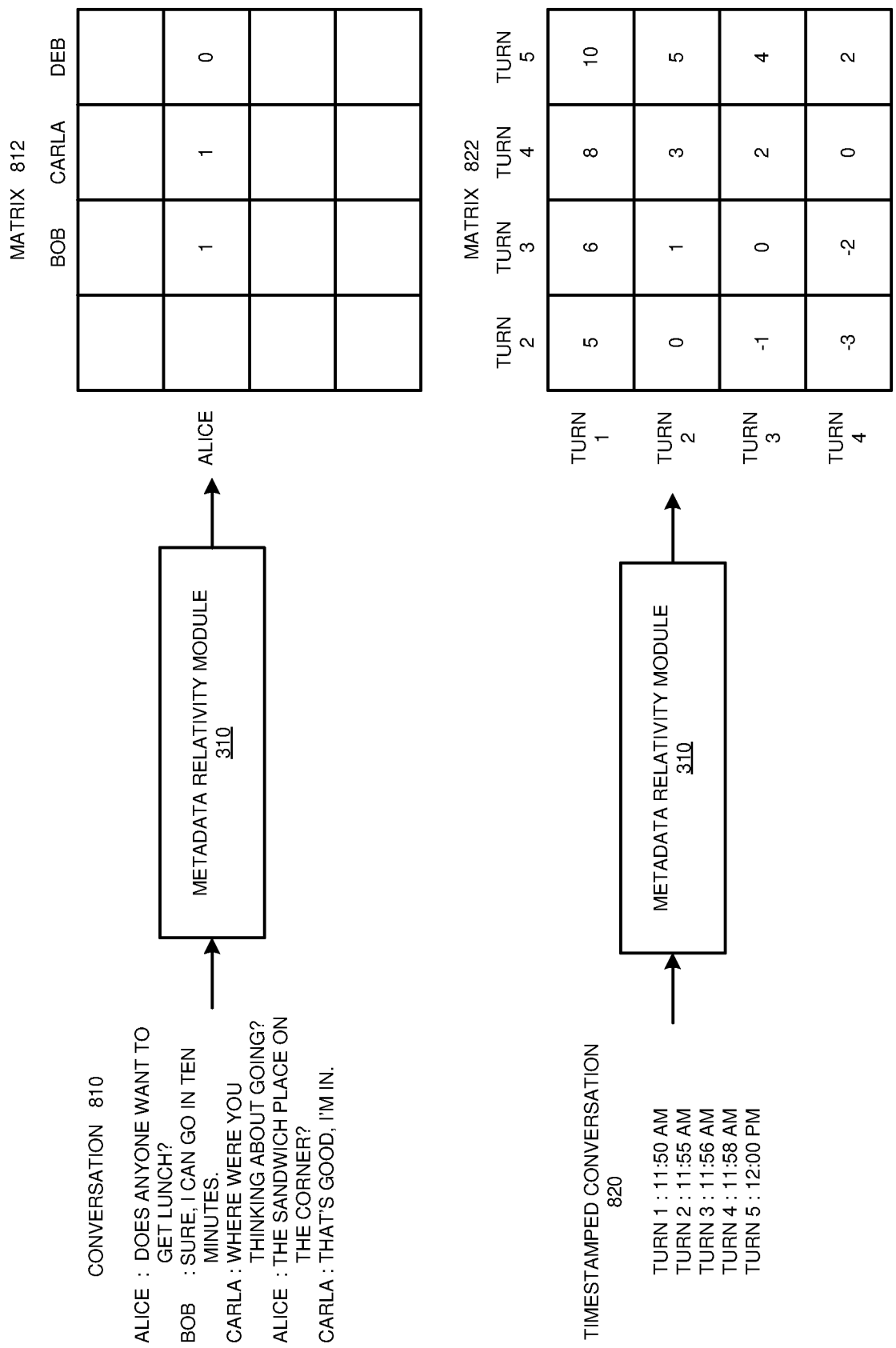
FIG. 8 depicts an example of transformer-based encoding incorporating metadata in accordance with an illustrative embodiment.

With reference to FIG. 8, this figure depicts an example of transformer-based encoding incorporating metadata in accordance with an illustrative embodiment. The example can be executed using application 300 in FIG. 3. Metadata relativity module 310 is the same as metadata relativity module 310 in FIG. 3.

In particular, FIG. 8 depicts construction of relativity matrix 812 from metadata of conversation 810. In matrix 812, an entry in a relativity matrix is set to one if there is a relationship between two instances of a type of metadata, and zero if there is not a relationship. Thus, because metadata of conversation 810 indicates which portions were spoken or texted by which participant, rows and columns of matrix 810 denote participants. An entry in relativity matrix 810 is set to one if there is a relationship between the participant denoted by the entry's row and the participant denoted by the entry's column, and zero if there is not a relationship.

FIG. 8 also depicts construction of relativity matrix 822 from metadata of timestamped conversation 820. In matrix 822, an entry in relativity matrix 822 is set to a distance, within the metadata, between two instances of a type of metadata. Thus, because metadata of conversation 820 records a timestamp corresponding to each change of participant, or turn, in a conversation, rows and columns of relativity matrix 822 denote specific turns, and an entry in matrix 822 is set to the amount of time elapsed between the turn denoted by the entry's row and the turn denoted by the entry's column.

Figure 9:
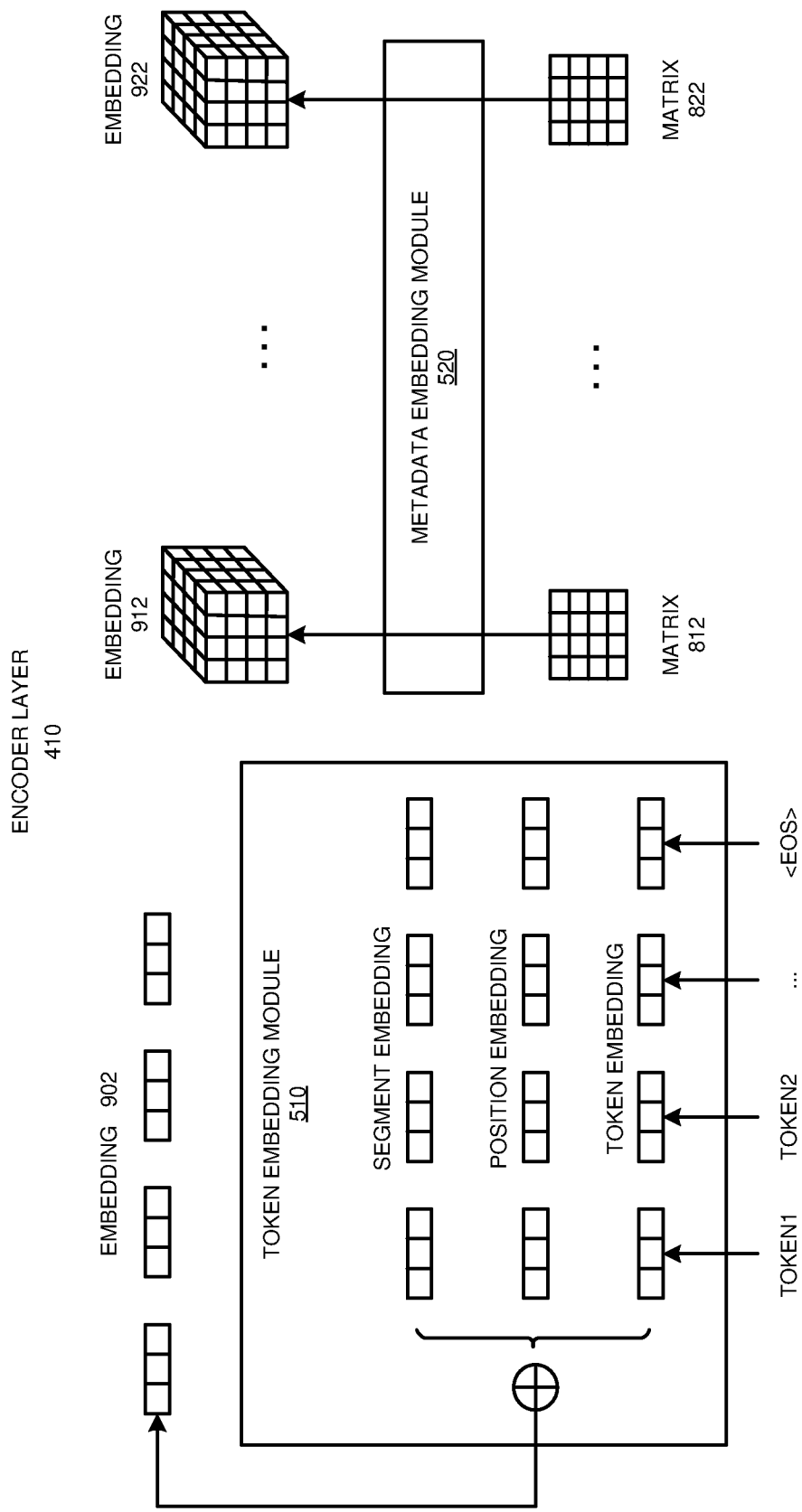
FIG. 9 depicts a continued example of transformer-based encoding incorporating metadata in accordance with an illustrative embodiment.

With reference to FIG. 9, this figure depicts a continued example of transformer-based encoding incorporating metadata in accordance with an illustrative embodiment. Token embedding module 510 and metadata embedding module 520 are the same as token embedding module 510 and metadata embedding module 520 in FIG. 5. Matrices 812 and 822 are the same as matrices 812 and 822 in FIG. 8.

Token embedding module 510 receives, as input, a sequence of tokens. Module 510 generates a token embedding encoding a token. Module 510 also generates a positional embedding and a segmentation or segment embedding, and combines the token, positional, and segmentation embeddings into token embedding 902.

Metadata embedding module 520 receives, as input, relativity matrices 812 and 822, and generates relativity embeddings 912 and 922 respectively.

Figure 10:
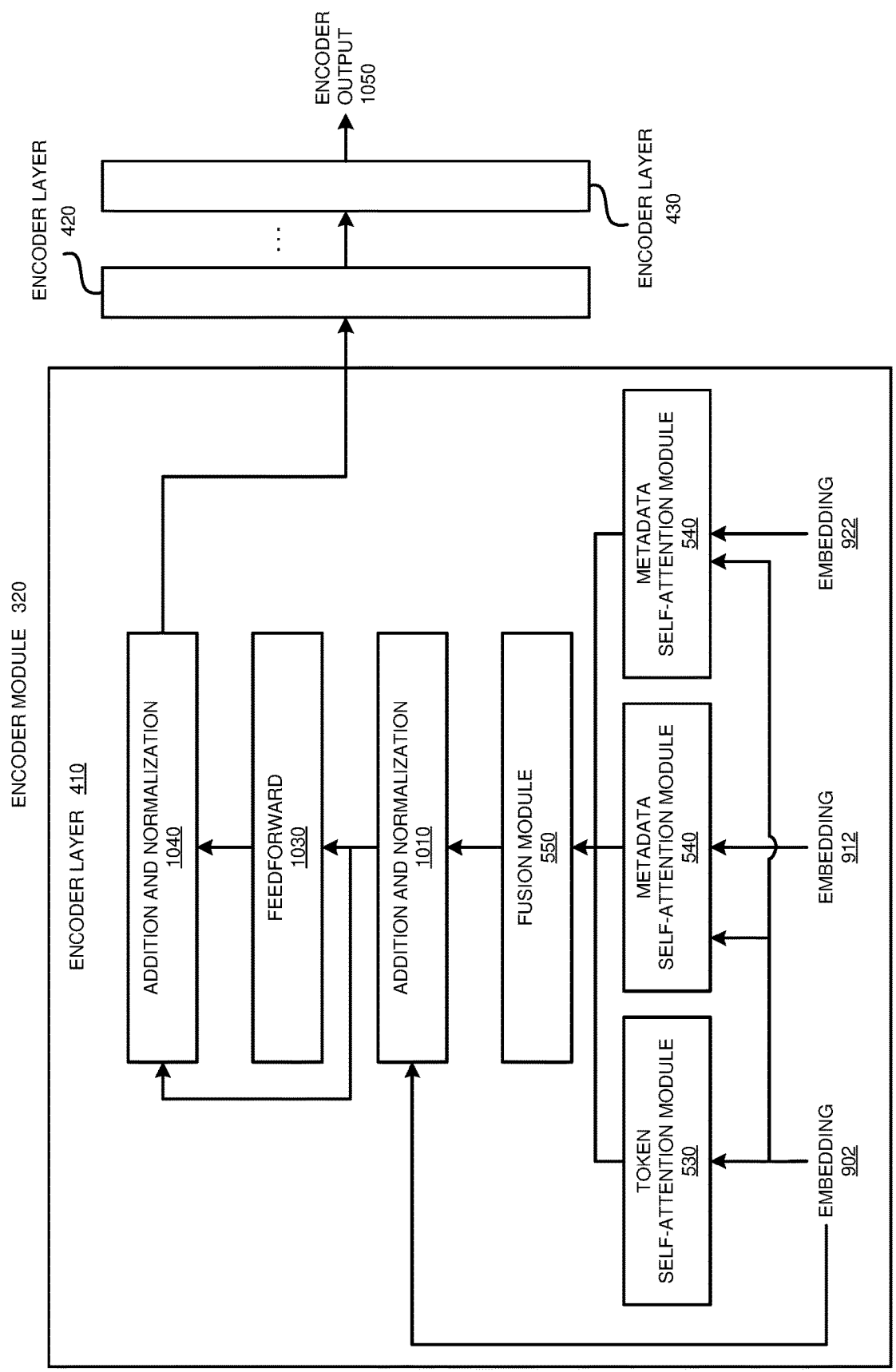
FIG. 10 depicts a continued example of transformer-based encoding incorporating metadata in accordance with an illustrative embodiment.

With reference to FIG. 10, this figure depicts a continued example of transformer-based encoding incorporating metadata in accordance with an illustrative embodiment. Encoder module 320 is the same as encoder module 320 in FIG. 3. Encoder layers 410, 420, and 430 are the same as encoder layers 410, 420, and 430 in FIG. 4. Token self-attention module 530, metadata self-attention modules 540, and fusion module 550 are the same as token self-attention module 530, metadata self-attention modules 540, and fusion module 550 in FIG. 5. Token embedding 902 and relativity embeddings 912 and 922 are the same as token embedding 902 and relativity embeddings 912 and 922 in FIG. 9. Note that FIG. 10 depicts details only of encoder layer 610; details of encoder layers 620 and 630 are not depicted.

Token self-attention module 530 alters token embedding 902 according to a set of attention weights. Each of metadata self-attention modules 540 alters relativity embeddings 912 and 922 respectively, according to corresponding sets of metadata attention weights. Fusion module 550 combines the results of modules 530 and 540. Optional addition and normalization module 1010 adds the output from fusion module 550 and embedding 902, then normalizes the result and passes the normalized result to feedforward 1030. Optional addition and normalization module 1040 adds together and normalizes the output of feedforward 1030 and input to feedforward 1030 and passes the result into encoder layer 420. Encoder layer 430, the last encoder layer in the series, generates encoder output 1050.

Figure 11:
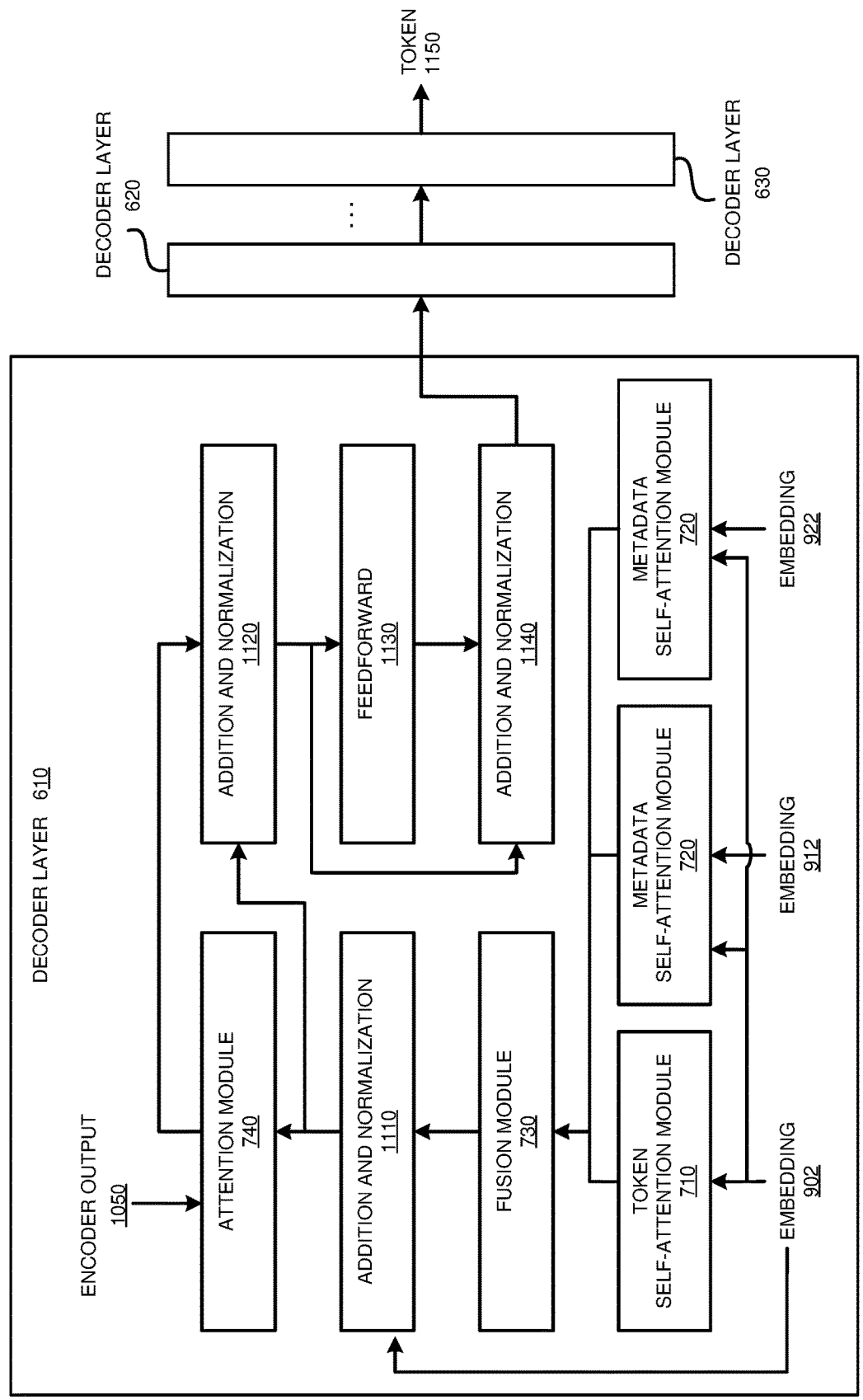
FIG. 11 depicts a continued example of transformer-based encoding incorporating metadata in accordance with an illustrative embodiment.

With reference to FIG. 11, this figure depicts a continued example of transformer-based encoding incorporating metadata in accordance with an illustrative embodiment. Decoder module 325 is the same as decoder module 325 in FIG. 3. Decoder layers 610, 620, and 630 are the same as encoder layers 610, 620, and 630 in FIG. 6. Token self-attention module 710, metadata self-attention modules 720, fusion module 730, and attention module 740 are the same as token self-attention module 710, one or more metadata self-attention modules 720, fusion module 730, and attention module 740 in FIG. 7. Token embedding 902 and relativity embeddings 912 and 922 are the same as token embedding 902 and relativity embeddings 912 and 922 in FIG. 9. Encoder output 1050 is the same as encoder output 1050 in FIG. 10. Note that FIG. 11 depicts details only of decoder layer 610; details of decoder layers 620 and 630 are not depicted.

Token self-attention module 710 alters token embedding 902 according to a set of attention weights. Each of metadata self-attention modules 720 alters relativity embeddings 912 and 922 respectively, according to corresponding sets of metadata attention weights. Fusion module 730 combines the results of modules 710 and 720. Optional addition and normalization module 1110 adds the output from fusion module 730 and embedding 902, then normalizes the result and passes the normalized result to attention module 740. Attention module 740 combines output from fusion module 740 or addition and normalization module 1110 with encoder output 1050. Optional addition and normalization module 1120 adds the output from attention module 740 and the input to attention module 740, then normalizes the result and passes the normalized result to feedforward 1030. Optional addition and normalization module 1140 adds together and normalizes the output of feedforward 1130 and input to feedforward 1130 and passes the result into decoder layers token 1150.

Figure 12:
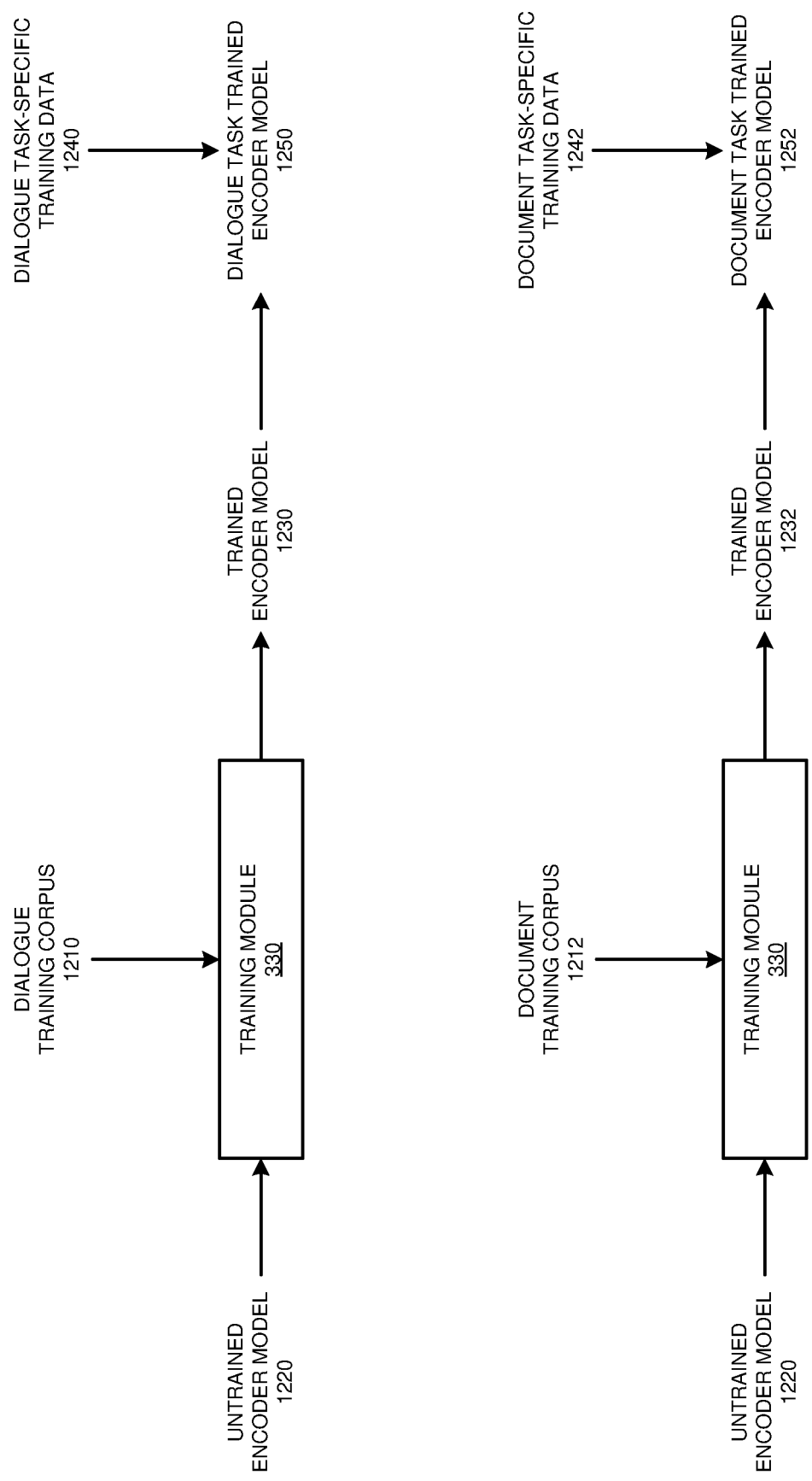
FIG. 12 depicts a continued example of transformer-based encoding incorporating metadata in accordance with an illustrative embodiment.

With reference to FIG. 12, this figure depicts a continued example of transformer-based encoding incorporating metadata in accordance with an illustrative embodiment. Training module 330 is the same as training module 330 in FIG. 3.

In particular, FIG. 12 depicts model training for a specific downstream task. Thus, training module 330 trains untrained encoder model 1220 using dialogue training corpus 1210 to produce trained encoder model 1230, then uses dialogue task-specific training data 1240 to further train model 1230, resulting in dialogue task trained dialogue model 1250. Similarly, training module 330 trains untrained encoder model 1220 using document training corpus 1212 to produce trained encoder model 1232, then uses document task-specific training data 1242 to further train model 1232, resulting in document task trained dialogue model 1252.

Figure 13:
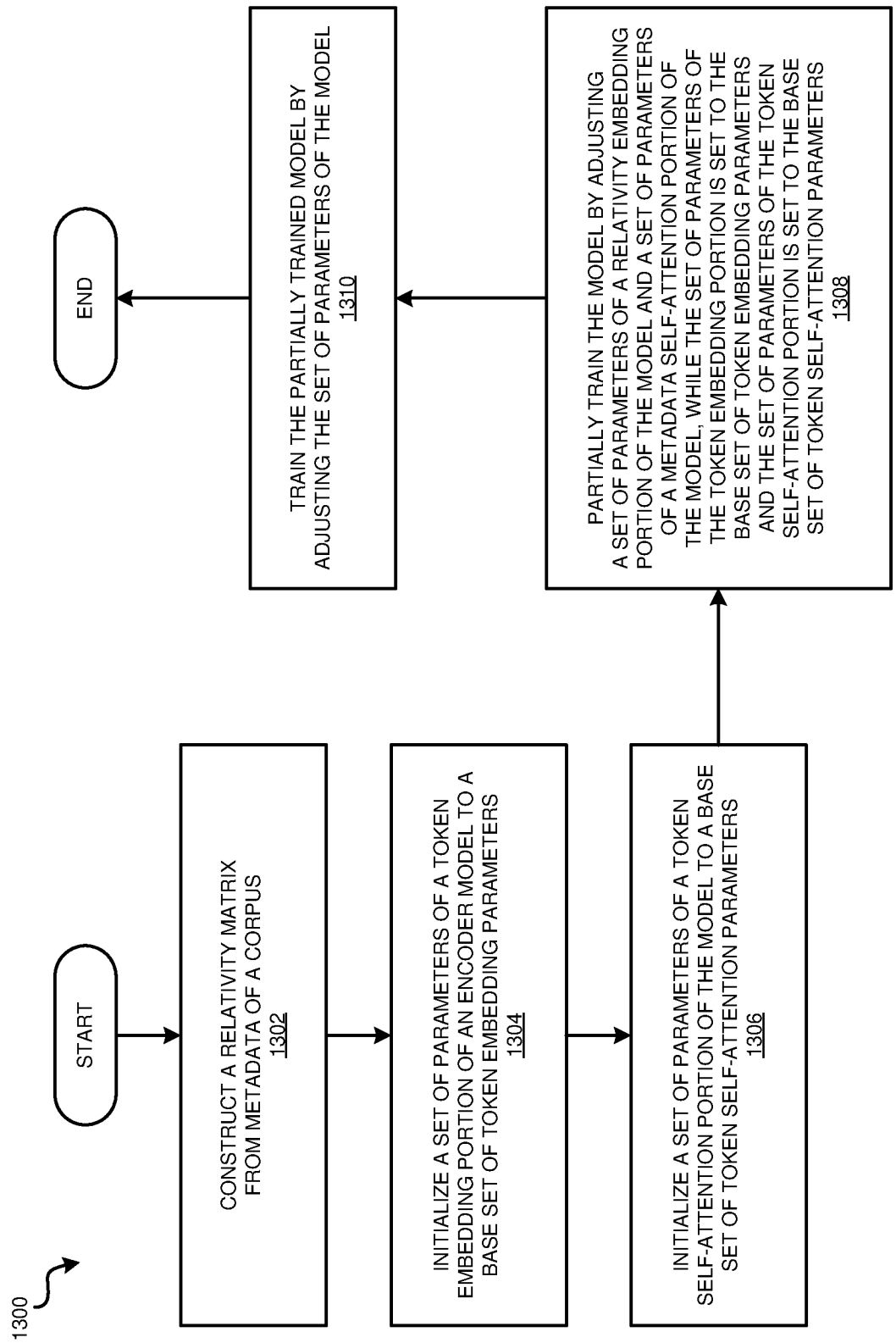
FIG. 13 depicts a flowchart of an example process for transformer-based encoding incorporating metadata in accordance with an illustrative embodiment.

With reference to FIG. 13, this figure depicts a flowchart of an example process for transformer-based encoding incorporating metadata in accordance with an illustrative embodiment. Process 1300 can be implemented in application 300 in FIG. 3.

In block 1302, the application constructs a relativity matrix from metadata of a corpus of natural language text documents or non-textual data. In block 1304, the application initializes a set of parameters of a token embedding portion of an encoder model to a base set of token embedding parameters. In block 1306, the application initializes a set of parameters of a token self-attention portion of the model to a base set of token self-attention parameters. In block 1308, the application partially trains the model by adjusting a set of parameters of a relativity embedding portion of the model and a set of parameters of a metadata self-attention portion of the model, while the set of parameters of the token embedding portion is set to the base set of token embedding parameters and the set of parameters of the token self-attention portion is set to the base set of token self-attention parameters. In block 1310, the application trains the partially trained model by adjusting the set of parameters of the model. Then the application ends.

Figure 14:
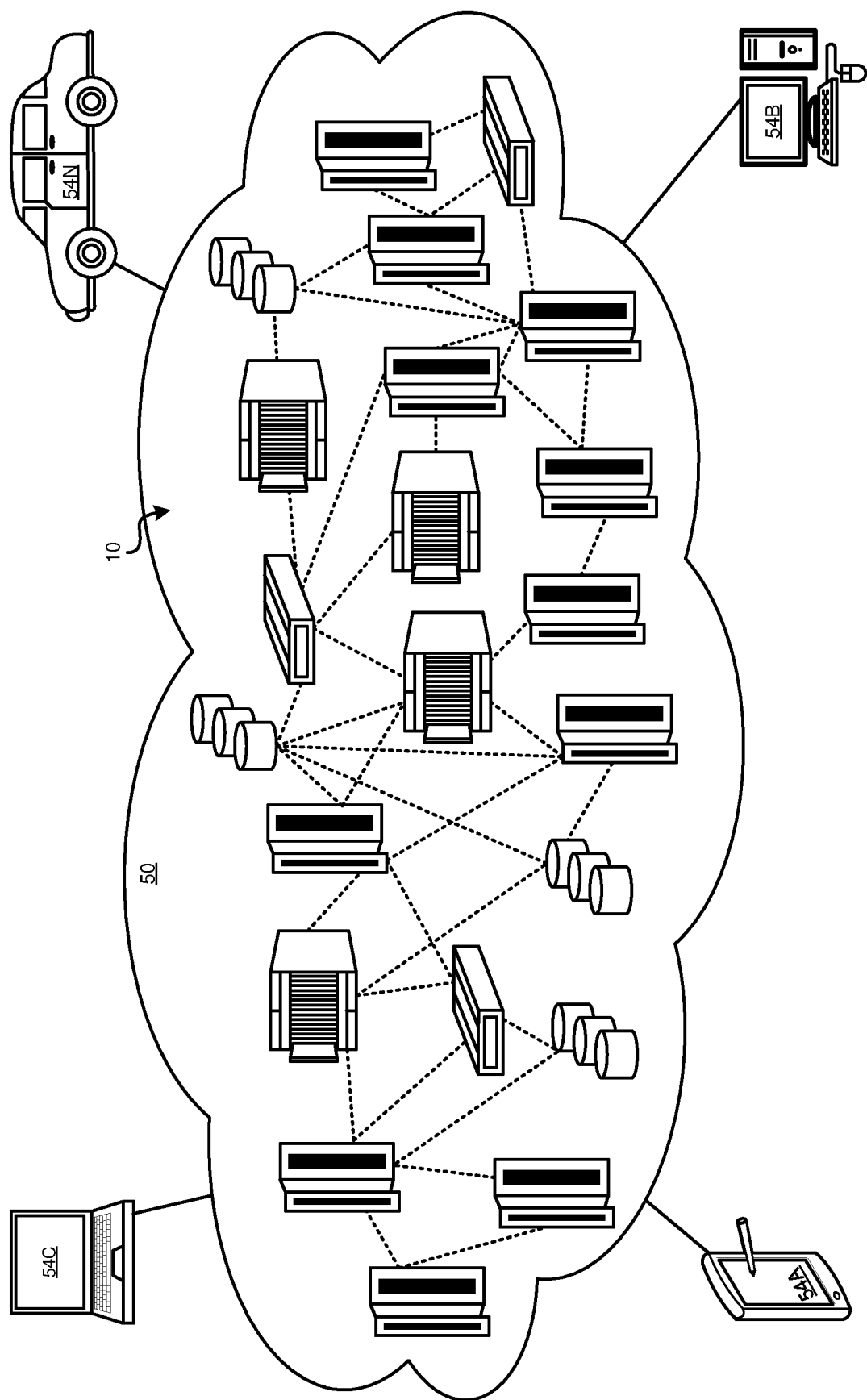
FIG. 14 depicts a cloud computing environment according to an embodiment of the present invention.

Referring now to FIG. 14, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 15:
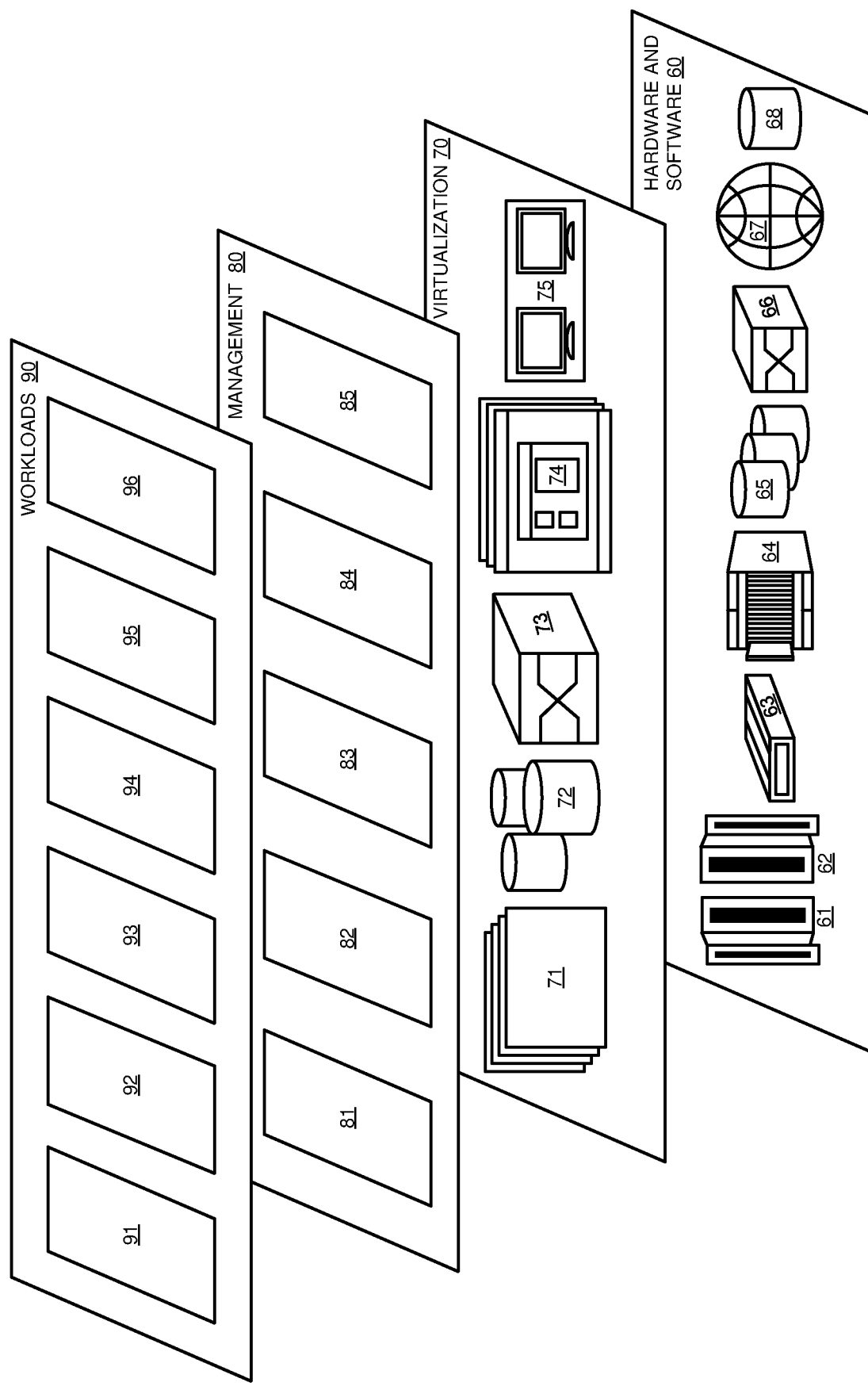
FIG. 15 depicts abstraction model layers according to an embodiment of the present invention.

Referring now to FIG. 15, a set of functional abstraction layers provided by cloud computing environment 50 (FIG. 14) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for transformer-based encoding incorporating metadata and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
constructing, from metadata of a corpus of natural language text documents, a relativity matrix, a row-column intersection in the relativity matrix corresponding to a relationship between two instances of turn-based metadata of a conversation; and
training an encoder model to compute an embedding corresponding to a token of a natural language text document within the corpus and the relativity matrix, the encoder model comprising a first encoder layer, the first encoder layer comprising a token embedding portion, a relativity embedding portion, a token self-attention portion, a metadata self-attention portion, and a fusion portion, the relativity embedding portion generating an input relativity embedding, the input relativity embedding encoding an entry in the relativity matrix, the metadata self-attention portion adjusting the input relativity embedding according to a set of metadata attention weights, the fusion portion combining an output of the token self-attention portion and an output of the metadata self-attention portion, the training comprising adjusting a set of parameters of the encoder model, the training generating a trained encoder model, wherein a parameter in the set of parameters of the encoder model is distinct from a layer in the encoder model,
wherein the training comprises a training stage in which (i) a parameter of the token embedding portion and (ii) a parameter of the token self-attention portion are each held constant,
and in which the training stage further changes (i) a parameter of the relativity embedding portion, and (ii) at least one parameter selected from a set of parameters comprising: the metadata self-attention portion, another attention portion, and the fusion portion.

2. The computer-implemented method of claim 1, wherein the token embedding portion computes a set of token embeddings, a token embedding in the set of token embeddings corresponding to a token of a natural language text document within the corpus.

3. The computer-implemented method of claim 2, wherein the token comprises a portion of a word of the natural language text document.

4. The computer-implemented method of claim 2, wherein the token embedding comprises a multidimensional numerical representation of the token.

5. The computer-implemented method of claim 2, wherein the token embedding comprises a combination of a multidimensional numerical representation of the token, a multidimensional numerical representation of a position of the token within the natural language text document, and a multidimensional numerical representation of a segment of the natural language text document in which the token is located.

6. The computer-implemented method of claim 1, wherein the token self-attention portion adjusts an input token embedding according to a set of token attention weights, a token attention weight in the set of token attention weights corresponding to a relationship within the natural language text document between two tokens, the set of token attention weights computed during the training.

7. The computer-implemented method of claim 1, wherein the set of metadata attention weights is computed during the training.

8. The computer-implemented method of claim 1, wherein the training comprises:
   initializing a set of parameters of the token embedding portion to a base set of token embedding parameters;
   initializing a set of parameters of the token self-attention portion to a base set of token self-attention parameters;
   first training the encoder model, the first training comprising adjusting a set of parameters of the relativity embedding portion and a set of parameters of the metadata self-attention portion while the set of parameters of the token embedding portion is set to the base set of token embedding parameters and the set of parameters of the token self-attention portion is set to the base set of token self-attention parameters, the first training generating a partially trained encoder model; and
   second training the partially trained encoder model, the second training comprising adjusting the set of parameters of the partially trained encoder model, the second training generating the trained encoder model.

9. The computer-implemented method of claim 1, wherein the encoder model further comprises a first decoder layer, the first decoder layer comprising a decoder token self-attention portion, a decoder metadata self-attention portion, a decoder fusion portion, and a decoder attention portion, the training comprising adjusting a set of parameters of the first decoder layer.

10. The computer-implemented method of claim 9, wherein the decoder attention portion adjusts an output of an encoder layer according to a set of attention weights, the set of attention weights computed during the training.

11. The computer-implemented method of claim 1, further comprising a second metadata self-attention portion adjusting a second input relativity embedding according to a second set of metadata attention weights, the second input relativity embedding comprising a multidimensional numerical representation of a row-column intersection in a second relativity matrix, the row-column intersection in the second relativity matrix corresponding to a relationship between two instances of a second type of metadata.

12. A computer program product for transformer-based natural language text autoencoding, the computer program product comprising:
   one or more computer readable storage media, and program instructions collectively stored on the one or more computer readable storage media, the program instructions comprising:
      program instructions to construct, from metadata of a corpus of natural language text documents, a relativity matrix, a row-column intersection in the relativity matrix corresponding to a relationship between two instances of turn-based metadata of a conversation; and
      program instructions to train an encoder model to compute an embedding corresponding to a token of a natural language text document within the corpus and the relativity matrix, the encoder model comprising a first encoder layer, the first encoder layer comprising a token embedding portion, a relativity embedding portion, a token self-attention portion, a metadata self-attention portion, and a fusion portion, the relativity embedding portion generating an input relativity embedding, the input relativity embedding encoding an entry in the relativity matrix, the metadata self-attention portion adjusting the input relativity embedding according to a set of metadata attention weights, the fusion portion combining an output of the token self-attention portion and an output of the metadata self-attention portion, the training comprising adjusting a set of parameters of the encoder model, the training generating a trained encoder model, wherein a parameter in the set of parameters of the encoder model is distinct from a layer in the encoder model,
      wherein the program instructions to train comprise program instructions to perform a training stage in which (i) a parameter of the token embedding portion and (ii) a parameter of the token self-attention portion are each held constant,
      and in which the training stage further changes (i) a parameter of the relativity embedding portion, and (ii) at least one parameter selected from a set of parameters comprising: the metadata self-attention portion, another attention portion, and the fusion portion.

13. The computer program product of claim 12, wherein the token embedding portion computes a set of token embeddings, a token embedding in the set of token embeddings corresponding to a token of a natural language text document within the corpus.

14. The computer program product of claim 13 wherein the token comprises a portion of a word of the natural language text document.

15. The computer program product of claim 13, wherein the token embedding comprises a multidimensional numerical representation of the token.

16. The computer program product of claim 12, wherein the stored program instructions are stored in the at least one of the one or more storage media of a local data processing system, and wherein the stored program instructions are transferred over a network from a remote data processing system.

17. The computer program product of claim 12, wherein the stored program instructions are stored in the at least one of the one or more storage media of a server data processing system, and wherein the stored program instructions are downloaded over a network to a remote data processing system for use in a computer readable storage device associated with the remote data processing system.

18. The computer program product of claim 12, wherein the computer program product is provided as a service in a cloud environment.

19. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to construct, from metadata of a corpus of natural language text documents, a relativity matrix, a row-column intersection in the relativity matrix corresponding to a relationship between two instances of turn-based metadata of a conversation; and program instructions to train an encoder model to compute an embedding corresponding to a token of a natural language text document within the corpus and the relativity matrix, the encoder model comprising a first encoder layer, the first encoder layer comprising a token embedding portion, a relativity embedding portion, a token self-attention portion, a metadata self-attention portion, and a fusion portion, the relativity embedding portion generating an input relativity embedding, the input relativity embedding encoding an entry in the relativity matrix, the metadata self-attention portion adjusting the input relativity embedding according to a set of metadata attention weights, the fusion portion combining an output of the token self-attention portion and an output of the metadata self-attention portion, the training comprising adjusting a set of parameters of the encoder model, the training generating a trained encoder model, wherein a parameter in the set of parameters of the encoder model is distinct from a layer in the encoder model, wherein the program instructions to train comprise program instructions to perform a training stage in which (i) a parameter of the token embedding portion and (ii) a parameter of the token self-attention portion are each held constant, and in which the training stage further changes (i) a parameter of the relativity embedding portion, and (ii) at least one parameter selected from a set of parameters comprising: the metadata self-attention portion, another attention portion, and the fusion portion.

* * * * *